(12) United States Patent
Peters et al.

(10) Patent No.: US 9,834,250 B2
(45) Date of Patent: Dec. 5, 2017

(54) BEARING COMPONENT WITH COMPOSITE FLANGE

(71) Applicants: AKTIEBOLAGET SKF, Göteborg (SE); SEMCON AB, Göteborg (SE)

(72) Inventors: Gilbert Peters, Nijmegen (NL); Richard Schaake, Utrecht (NL); Edo Schramm, The Hague (NL); Cornelius Petrus Antonius Vissers, Den Dungen (NL)

(73) Assignee: AKTIEBOLAGET SKF, Gothenburg (SE)

( * ) Notice: Subject to any disclaimer, the term of this patent is extended or adjusted under 35 U.S.C. 154(b) by 82 days.

(21) Appl. No.: 14/895,931

(22) PCT Filed: Jun. 6, 2014

(86) PCT No.: PCT/EP2014/061886
§ 371 (c)(1),
(2) Date: Dec. 4, 2015

(87) PCT Pub. No.: WO2014/195485
PCT Pub. Date: Dec. 11, 2014

(65) Prior Publication Data
US 2016/0121650 A1    May 5, 2016

(30) Foreign Application Priority Data
Jun. 7, 2013   (WO) ................. PCT/EP2013/061790

(51) Int. Cl.
*B62D 7/18*       (2006.01)
*B60B 5/02*       (2006.01)
(Continued)

(52) U.S. Cl.
CPC .............. *B62D 7/18* (2013.01); *B29C 70/845* (2013.01); *B60B 5/02* (2013.01); *B60B 27/00* (2013.01);
(Continued)

(58) Field of Classification Search
CPC ....... B29C 70/84; B29C 70/845; B29C 70/86; B29C 70/865; B60B 5/02; B60B 27/0005;
(Continued)

(56) References Cited

U.S. PATENT DOCUMENTS

2014/0161382 A1*  6/2014  Gulli ................... B60B 27/0094
                                                              384/515
2014/0197678 A1*  7/2014  Olivieri ............... B60B 27/0078
                                                              301/110

FOREIGN PATENT DOCUMENTS

DE      102010008319 A1   8/2011
EP         1859958 A1    11/2007
(Continued)

*Primary Examiner* — Phillip A Johnson
(74) *Attorney, Agent, or Firm* — Bryan Peckjian; SKF USA Inc. Patent Dept.

(57) ABSTRACT

A flanged bearing ring comprising a flange part joined to a ring part. The flange part is at least partly made of a fiber-reinforced matrix material, which is overmolded to the ring part. The flange part further comprises a first connection interface for enabling a component such as a vehicle wheel to be screwed or bolted to the flange part. The first connection interface comprises a plurality of bolt inserts which are embedded in the fiber-reinforced matrix material. At least one bolt insert is joined to the ring part by a continuous fiber tow that is wound around part of an outer surface of the bolt insert and of the ring part. Suitably, each bolt insert is joined to the ring part in this manner.

15 Claims, 3 Drawing Sheets

(51) Int. Cl.
    *B60B 27/00*        (2006.01)
    *B60B 27/06*        (2006.01)
    *B29C 70/84*        (2006.01)
    *B29K 263/00*      (2006.01)
    *B29K 307/04*      (2006.01)

(52) U.S. Cl.
    CPC ........ *B60B 27/0094* (2013.01); *B60B 27/065* (2013.01); *B29K 2263/00* (2013.01); *B29K 2307/04* (2013.01); *B60B 2310/321* (2013.01); *B60B 2900/111* (2013.01); *B60G 2206/50* (2013.01); *B60G 2206/71* (2013.01); *Y02T 10/86* (2013.01)

(58) Field of Classification Search
    CPC ... B60B 27/001; B60B 27/0094; F16C 19/18; F16C 19/181; F16C 19/182; F16C 19/183; F16C 19/184; F16C 19/185; F16C 19/186; F16C 19/187; F16C 19/38; F16C 19/383; F16C 19/385; F16C 19/386; F16C 19/581; F16C 19/62; F16C 2208/82
    See application file for complete search history.

(56) References Cited

FOREIGN PATENT DOCUMENTS

| | | | | |
|---|---|---|---|---|
| JP | 2011178314 A | | 9/2011 | |
| JP | 2011240831 A | * | 12/2011 | ............... F16C 35/06 |
| WO | WO 2012122993 A1 | * | 9/2012 | ........... B22D 17/007 |
| WO | WO 2012176772 A1 | * | 12/2012 | ........... F16C 33/588 |

* cited by examiner

BEARING COMPONENT WITH COMPOSITE FLANGE

CROSS REFERENCE TO RELATED APPLICATIONS

This is a United States National Stage Application claiming the benefit of International Application Number PCT/EP2014/061886 filed on 6 Jun. 2014 (06.06.2014), which claims the benefit of Europe (EP) Patent Application PCT/EP2013/061790 filed on 7 Jun. 2013 (07.06.2013), both of which are incorporated herein by reference in their entireties.

FIELD OF THE INVENTION

The present invention relates to a flanged bearing ring, especially a flanged bearing ring of a hub bearing unit, which has a flange part that is at least partly made from a fiber-reinforced composite.

BACKGROUND TO THE INVENTION

In the interests of fuel economy, there is an increasing drive within the automotive industry towards weight reduction of the component parts of vehicles. A vehicle wheel bearing is one example of an automotive component where weight reduction is desirable, also in view of the fact that the wheel bearings belong to the unsprung weight of a vehicle. Raceways of the bearings need to be made from a material of sufficient hardness in order to withstand the stresses of rolling contact. Titanium and certain ceramics are materials that possess the necessary mechanical properties and are also low in weight. They are also expensive and, consequently, bearing steel is more commonly used. Bearing steel has excellent hardenability but cannot be viewed as a lightweight material. Thus, one solution for reducing the weight of a wheel bearing comprising bearing steel is to form the bearing rings from bearing steel and to form further structural elements of the wheel bearing from a fiber-reinforced polymer.

An example of such a wheel bearing is disclosed in JP2011178314. The wheel bearing has a flanged inner ring, for connecting a vehicle wheel and brake disc to the bearing, and has a flanged outer ring for connecting the bearing to e.g. a steering knuckle. Each bearing flange is made of a laminated body of a carbon-fiber prepreg, formed by e.g. braiding the fibers and binding them in resin around a cylindrical surface of the bearing inner ring or outer ring.

There is still room for improvement.

SUMMARY OF THE INVENTION

The present invention resides in a flanged bearing ring as specified in claim 1, whereby the dependent claims describe advantageous embodiments and further developments of the invention.

The flanged bearing ring comprises a flange part joined to a ring part. The flange part is at least partly made of a fiber-reinforced matrix material, which is overmolded to the ring part. The flange part further comprises a first connection interface for enabling a component such as a vehicle wheel to be screwed or bolted to the flange part. The first connection interface comprises a plurality of bolt inserts which are embedded in the fiber-reinforced matrix material. According to the invention, at least one bolt insert is joined to the ring part by a continuous fiber tow that is wound around part of an outer surface of the bolt insert and of the ring part. Suitably, each bolt insert is joined to the ring part in this manner.

The forces acting on the flange part are introduced via the first connection interface and via a second connection interface between the flange part and the ring part. In bearing applications, e.g. wheel bearing applications, the forces concerned can be substantial. A force acting on one connection interface results in a reaction force on the other connection interface. The resulting load path runs between the connection interfaces, meaning that the flange part in a flanged bearing ring according to the invention comprises fiber-reinforcement located at, and in alignment with, the load path. Consequently, the composite part has improved strength and stiffness where it is needed most.

In a further development, additional strength and stiffness is provided in that at least a first bolt insert is joined to a second bolt insert by a continuous fiber tow that is wound around part of an outer surface of the first and second bolt inserts. Suitably, each bolt insert is joined to an adjacent bolt insert in this manner.

The continuous fiber tows which interconnect the bolt inserts and which connect the ring part to each bolt inserts may be made from carbon, glass, aramid, HBO or HDPE fibers. Advantageously, different types of fiber are selected, depending on the properties requires. For example, an aramid fiber such as Kevlar® may be selected to provide energy absorption and safety in response to impact loads. A high-modulus carbon fiber may be selected to enhance stiffness. Alternatively or additionally, a high-strength carbon fiber may be selected to increase strength and load-carrying capacity.

As will be understood, the type of fiber, the number of fibers in the continuous fiber tow and the number of loops around the ring part and a bolt insert are selected depending on the application loads in question.

The continuous fiber tows provide strength and stiffness in tension. Advantageously, the fibers are pre-tensioned during the winding process, to obtain optimal performance from the fiber properties.

In a still further development of the invention, the outer surface of one or both of the ring part and a bolt insert is provided with retaining means for holding the continuous fiber tow in place during and after the winding process, such that fiber pretension is maintained.

In one example, the ring part and/or at least one bolt insert has a groove in the outer surface with a depth and width that is essentially equal to the diameter of the fiber tow. Typically, the fiber tow has a diameter of 0.5-1.5 mm. During the winding process, the fiber tow is wound around the groove, which helps to keep the fiber tow in place, thereby facilitating pre-tensioning. In a further example, the outer surface of the ring part and/or of at least one bolt insert is provided with pegs that protrude from the outer surface, for guiding and retaining the fiber tows.

The winding process results in a pre-form, which is then overmolded with the fiber-reinforced matrix material. In a preferred example, the fiber-reinforced matrix material is a long-fiber molding compound comprising fibers with a length of 5-50 mm, embedded in a polymer matrix. Suitable materials for the fibers include glass, carbon, aramid, PBO (polybenzoxazole) and HDPE (high-density polyethelene). Suitable matrix materials include epoxy resin, phenolic resin, bismaleimide resin and polyimide resin.

The bolt inserts and the ring part of the flanged bearing ring are additionally joined to each other via the fiber-reinforced matrix material, which flows around the outer surface of each component during the overmolding of the flange part. In a still further development, the outer surface of at least one of the ring part and a bolt insert is provided with a recessed portion. Preferably, the recessed portion runs continuously around a radially outer surface of the ring part or bolt insert. The fiber-reinforced matrix material will therefore flow into the recess during the molding process, which will mechanically lock the ring part or bolt insert to the flange part in an axial direction. The robustness of the flanged bearing ring is therefore further improved.

As mentioned, the continuous fiber tows in the flange part are located in the load path between the first and second connection interfaces. The load path is an ideal site for measuring application loads. In a still further development of the invention, at least one of the continuous fiber tows that join the ring part and at least one bolt insert comprises a sensing fiber. An optical fiber comprising one or more fiber Bragg gratings is one example of a suitable sensing fiber. The sensing fiber may also be a piezoelectric fiber. Thus, the loads that act on the bearing, which loads are transferred to the bearing through the flange part, can be accurately measured in a flanged bearing ring according to the invention.

The present invention further defines a method of manufacturing a flanged bearing ring comprising a flange part that is at least partly made of a fiber-reinforced matrix material, which is overmolded to a joining surface on a ring part of the bearing, wherein the flange part comprises a plurality of bolt inserts embedded in the overmolded material. The method comprises steps of:
  i. arranging the plurality of bolt inserts at a radial distance from the joining surface of the ring part;
  ii. winding a continuous fiber tow around part of the joining surface and around part of a radially outer surface of at least one bolt insert, thereby creating a pre-form in which the ring part and the at least one bolt insert connected via one or more loops of the continuous fiber tow; and
  iii. overmolding the fiber-reinforced matrix material to the pre-form.

Preferably, the step of winding comprises joining each bolt insert to the ring part via one or more loops of a continuous fiber tow.

The step of winding may further comprise joining at least a first bolt insert to a second bolt insert by looping a continuous fiber tow around part of the outer surface of the first and second bolt insert.

In a further development, the joining surface of the ring part and/or the radially outer surface of at least one bolt insert is provided with retaining means, and the step of winding comprises using the retaining means to pretension the continuous fiber tow. The retaining means may be formed by a surface groove with a width and depth essentially equal to the diameter of the fiber tow, or by one or more pegs that protrude from the surface.

After the step of winding, the pre-form is placed in a mould. Advantageously, the ring part and each bolt insert are used in the step of overmolding to support and precisely locate the pre-form within the mould. This also helps to ensure that fiber pretension is maintained.

Thus, a robust and lightweight flanged bearing ring may be manufactured using the method of the invention.

Other advantageous of the present invention will become apparent from the details description and accompanying drawings.

BRIEF DESCRIPTION OF THE DRAWINGS

The invention will now be described further, with reference to the following Figures.

DETAILED DESCRIPTION OF THE PRESENT INVENTION

A hub bearing unit is an example of a bearing that may comprise at least one flanged bearing ring. In some examples, the inner ring of the hub bearing unit has a wheel mounting flange for mounting a wheel rim and a brake disc to the bearing. The outer ring may also comprise a flange for attaching the bearing to e.g. a steering knuckle. In other examples, adapted for outer ring rotation, the bearing outer ring comprises a wheel mounting flange.

Figure 1A:
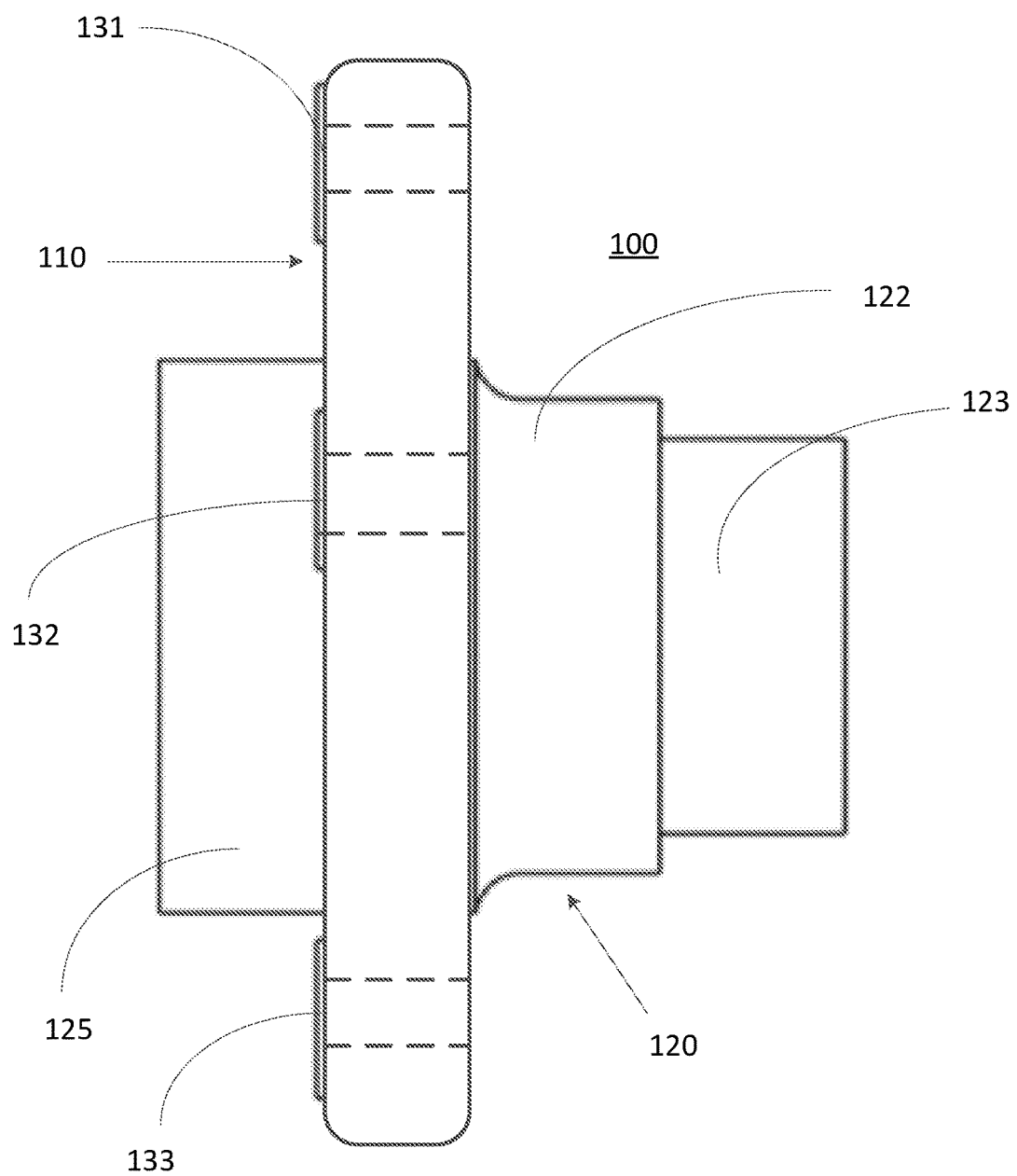
FIG. 1a shows a side view of a flanged bearing ring according to the invention, comprising a flange part overmolded to a ring part.

An example of a flanged bearing ring according to the invention is depicted in FIG. 1a. The flanged bearing ring 100 will form part of a hub bearing unit adapted for inner ring rotation, and comprises a radially extending wheel mounting flange 110 and an axially extending inner ring part 120. The ring part is made of bearing steel in the depicted example and comprises a raceway portion 122 with a hardened surface for receiving a row of rolling elements. The bearing will further comprise a separate inner ring (not shown) that is mounted on an axially inner portion 123 of the ring part. In addition, the ring part 120 comprises a spigot portion 125, to facilitate centering of a wheel rim that is mounted to the flange part 110 of the bearing ring 100. The flange part is at least partly made of a fiber-reinforced matrix material.

In conventional wheel bearing units, the flanged inner and/or outer ring is made entirely of bearing steel and bolt holes for attaching the brake disc and wheel rim are machined into the flange. When the flange is made of fiber-reinforced matrix material, the bolt holes are suitably formed by bolt inserts that are overmolded with the fiber-reinforced material.

Figure 1B:
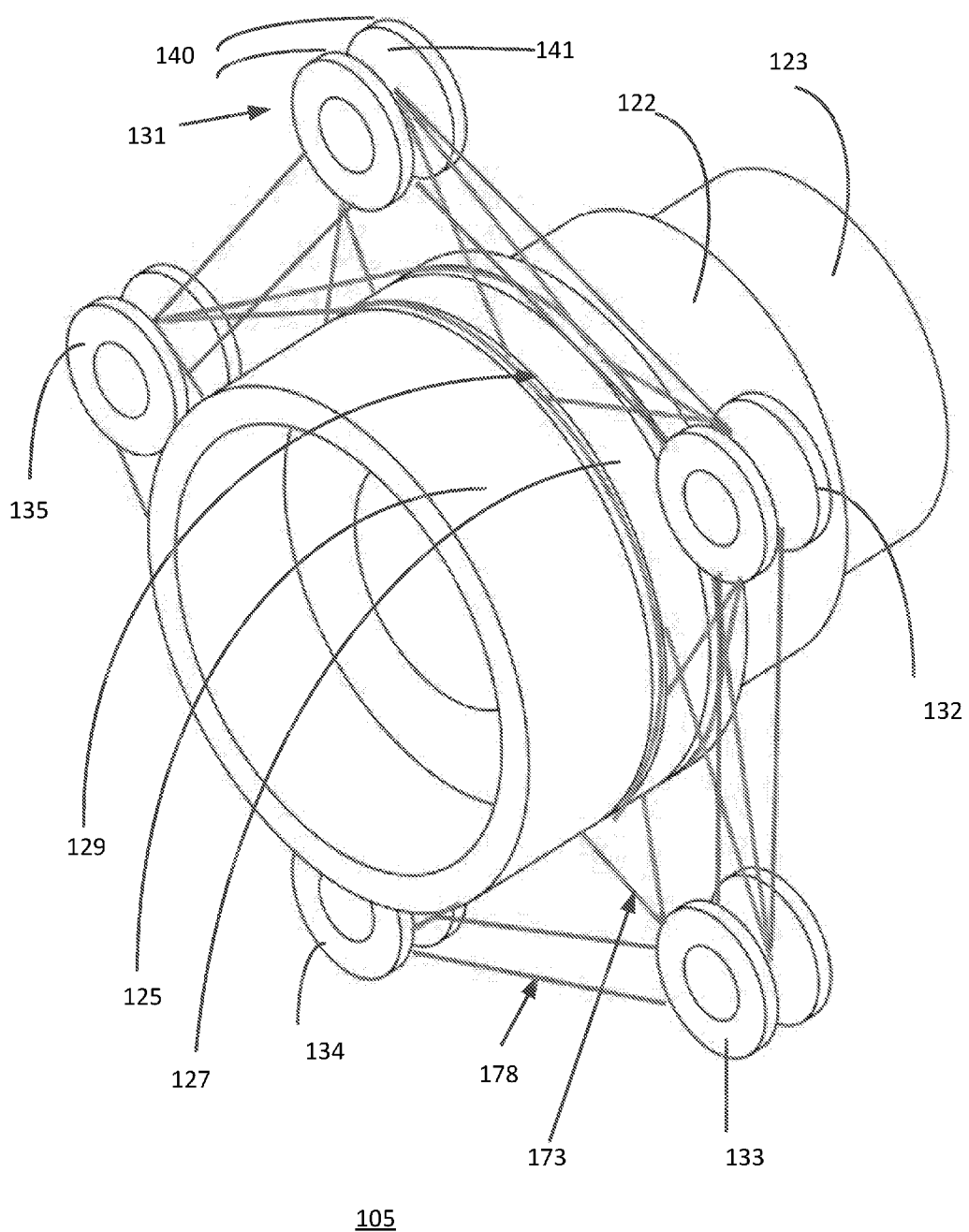
FIGS. 1b and 1c respectively show a perspective view and a front view of a pre-form of the flanged bearing ring from 1a, prior to overmolding.
Figure 1C:
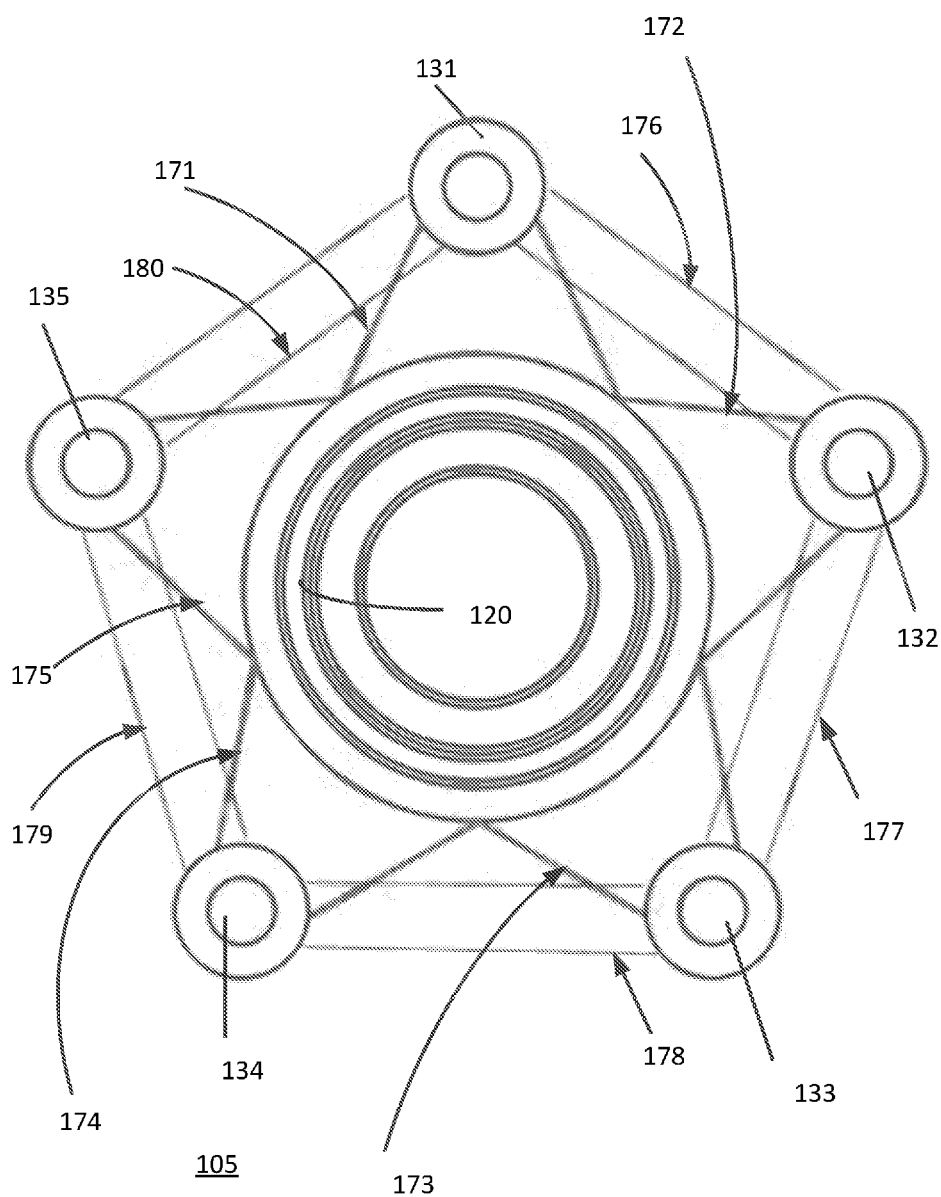

As can be more clearly seen in FIGS. 1b and 1c, the flange 110 has five bolt inserts 131, 132, 133, 134, 135 arranged at regular intervals, at a radial distance from the ring part 120. The bolt inserts are made of a metal such as steel and have a tubular geometry provided with an internal thread. The flange part 120 is made of a long-fiber molding compound that is overmolded to a joining surface 127 on the ring part 120. The joining surface is arranged between the raceway portion 122 and the spigot portion 125. During the overmolding process, the bolt inserts 131, 132, 133, 134, 135 become embedded in the flange part 110 and are thus joined to the ring part 120 via the molding compound.

According to the invention, the ring part is additionally joined to at least one of the bolt inserts by a continuous fiber tow that is wound around a section of the joining surface 127 and around a section of a radially outer surface of the at least one bolt insert. Preferably, as shown in FIGS. 1b and 1c, the ring part 120 is joined in this manner to each of the bolt inserts.

A first continuous fiber tow 171 is looped around a section of the radially outer surface of the first bolt insert 131 and around a section of the ring part joining surface 127. Second 172, third 173, fourth 174 and fifth 175 continuous fiber tows respectively join the second 132, third 133, fourth 134 and fifth 135 bolt inserts to the ring part 120 in a similar manner.

The loads on the vehicle wheel are transmitted to the hub bearing unit through the flange 110. The bolt inserts constitute load introduction points, and the load is then transmitted to the ring part 120 of the bearing through the joining surface 127. Therefore, the continuous fiber tows, 171, 172, 173, 174 and 175 follow the load path, which provides the flange 110 with excellent strength and stiffness.

The flange 110 is provided with further strength and stiffness in that adjacent bolt inserts are also joined to each other by a continuous fiber tow. A sixth continuous fiber tow 176 is looped around a section of the radially outer surface of the first and second bolt inserts 131, 132. A seventh continuous fiber tow 177 joins the second and third bolt inserts 132, 133 in the same manner. An eight continuous fiber tow 178 joins the third and fourth bolt inserts 133, 134 in the same manner. A ninth continuous fiber tow 179 joins the fourth and fifth bolt inserts 134, 135 in the same manner. Finally, a tenth continuous fiber tow 180 joins the fifth and first bolt inserts 135, 131 in the same manner.

The winding of the continuous fiber tows takes place prior to molding of the flange 110. A pre-form is thus produced, which is then overmolded with the long-fiber molding compound. FIGS. 1b and 1c respectively show a perspective view and a front view of the pre-form 105.

The ring part 120 is fixed on a rig (not shown). The first 131, second 132, third 133, fourth 134 and fifth bolt inserts (135) are likewise fixed to the rig, at locations corresponding to the bolt holes on a vehicle wheel.

The pre-form is made using e.g. an automated fiber placement machine or robot. Advantageously, the fiber tows are pretensioned during the winding process. To assist fiber-pretensioning and to help guide and retain the fiber tows, the joining surface 127 of the ring part and the radially outer surface of each bolt insert are preferably provided with retention means. In the example of FIG. 1b, one or more grooves 129 with a depth and width essentially equal to the diameter of the fiber tows are provided in the joining surface 127 of the ring part and in the radially outer surface of each bolt insert. The continuous fiber tows are then provided in these grooves during the winding process.

In the depicted example, the continuous fiber tows comprise dry carbon fibers. These fibers will become impregnated with matrix material that is absorbed from the long-fiber molding compound, when the flange part 110 is overmolded. It is also possible to use pre-impregnated fibers, which may be cured prior to placing the pre-form in the mould or which may be cured simultaneously with the molding compound.

When the pre-form is finished, it is placed in a mold. Suitably, the ring part 120 and each bolt insert 131, 132, 133, 134, 135 are precisely located and fixed to the mould during the molding process. This helps to maintain the pretension in the fiber tows, which was achieved during the winding process. Maintaining fiber pretension is advantageous in terms of optimizing the fiber properties and thus the performance of the finished component.

To facilitate the molding of the flange part 110 to the ring part 120, the joining surface 127 is preferably provided with an indentation or a continuous groove that is larger than the one or more fiber-retaining grooves 129. The molding compound will flow into this indentation, to provide mechanical locking between the flange part and ring part in an axial direction.

Each bolt insert preferably also has such an indentation for mechanically locking the bolt insert in an axial direction within the overmolded flange 110. In the example depicted in FIG. 1b, each bolt insert has the shape of a reel. Taking the first bolt insert 131 as an example, a radially extending rim 140 is provided at each axial end of the insert. The molding compound flows around the radial surface 141 between the rims 140, thereby locking the bolt insert 131 in a radial direction and an axial direction relative to the flange 110.

Thus, a flanged bearing ring according to the invention is a lightweight component which has sufficient strength and stiffness to withstand high application loads.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. A flanged bearing ring comprising:
a flange part joined to a ring part,
wherein the flange part is at least partly made of a fiber-reinforced matrix material, which is overmolded to the ring part, and
wherein the flange part comprises a plurality of connection points in the form of bolt inserts which are embedded in the fiber-reinforced matrix material;
wherein at least one of the bolt inserts is joined to the ring part by a continuous fiber tow that is wound around part of a radially outer surface of the at least one of the bolt inserts and around part of a radially outer surface of the ring part.

2. The flanged bearing ring according to claim 1, wherein each bolt insert is joined to the ring part by a continuous fiber tow that is wound around part of an outer surface of the bolt insert and of the ring part.

3. The flanged bearing ring according to claim 1, wherein at least one bolt insert of the bolt inserts is joined to a second bolt insert of the bolt inserts by a continuous fiber tow that is wound around part of the radially outer surface of the at least one bolt insert of the bolt inserts and the second bolt insert of the bolt inserts.

4. The flanged bearing ring according to claim 1, wherein the radially outer surface of at least one of (a) the at least one of the bolt inserts and (b) the radially outer surface of the ring part is provided with a retaining feature for guiding and retaining the continuous fiber tow.

5. The flanged bearing ring according to claim 4, wherein the retaining feature is formed by at least one groove having a depth and width essentially equal to a diameter of the continuous fiber tow.

6. The flanged bearing ring according to claim 4, wherein the retaining feature is formed by at least one peg which protrudes from the radially outer surface of at least one of (a) the at least one of the bolt inserts and (a) the ring part.

7. The flanged bearing ring according to claim 1, wherein the continuous fiber tow which joins one of the bolt inserts to the ring part comprises a sensing fiber for measuring a load on the flanged bearing ring.

8. The flanged bearing ring to claim 1, wherein the fiber-reinforced matrix material is a long fiber molding compound.

9. The flanged bearing ring according to claim 1, wherein the radially outer surface of at least one of (a) the at least one of the bolt inserts and (b) the ring part comprises a recessed portion into which the overmolded fiber-reinforced matrix material flows, for mechanically locking the radially outer surface to the fiber-reinforced matrix material.

10. A method of manufacturing a flanged bearing ring comprising a flange part that is at least partly made of a fiber-reinforced matrix material, which is overmolded to a joining surface on a ring part of the bearing, wherein the flange part comprises a plurality of bolt inserts embedded in the overmolded material, wherein the method comprises steps of:
  i. arranging the plurality of bolt inserts at a radial distance from the joining surface of the ring part;
  ii. winding a continuous fiber tow around part of the joining surface and around part of a radially outer surface of at least one bolt insert, thereby creating a pre-form in which the ring part and the at least one of the bolt inserts are connected via at least one loop of the continuous fiber tow;
  iii. overmolding the fiber-reinforced matrix material to the pre-form.

11. The method of claim 10, wherein the step of winding comprises joining each bolt insert to the ring part via one or more loops of a continuous fiber tow.

12. The method of claim 10, wherein the step of winding further comprises joining at least a first bolt insert to a second bolt insert by looping a continuous fiber tow around part of the radially outer surface of the first bolt insert and second bolt insert.

13. The method of claim 10 wherein, the joining surface of at least one of (a) the ring part and (b) the radially outer surface of the at least one of the bolt inserts is provided with a retaining feature, and
  the step of winding comprises using the retaining feature to pretension the continuous fiber tow during the winding.

14. The method of claim 13, wherein the retaining feature is formed by a surface groove with a width and depth essentially equal to the diameter of the continuous fiber tow, or by at least one peg that protrudes from the surface.

15. The method of claim 10, wherein the ring part and each bolt insert are used in the step of overmolding to support and precisely locate the pre-form within the mold.

* * * * *